United States Patent [19]
Wilson

[11] Patent Number: 5,022,258
[45] Date of Patent: Jun. 11, 1991

[54] GAS GAGE WITH ZERO NET GAS FLOW

[76] Inventor: Gardner P. Wilson, 587 South Hill Ave., Pasadena, Calif. 91106

[21] Appl. No.: 520,031

[22] Filed: May 7, 1990

[51] Int. Cl.$^5$ ............................................ G01B 13/08
[52] U.S. Cl. .................................. 73/37.5; 33/DIG. 2
[58] Field of Search ............... 73/37.5, 37; 33/DIG. 2

[56] References Cited

U.S. PATENT DOCUMENTS 4,142,401  3/1979  Wilson ................................. 73/37.5
4,953,388  9/1990  Barada ................................. 73/37.5

*Primary Examiner*—Hezron E. Williams
*Assistant Examiner*—William Frances
*Attorney, Agent, or Firm*—Donald D. Mon

[57] ABSTRACT

An instrument for measuring a gap between it and an opposing surface, comprising a gas conduit having an inlet and an outlet, a sensing orifice in the outlet, a gas pump connected to the inlet for applying an alternating pressure to the gas conduit so that puffs of gas are directed from and drawn back to the sensing orifice. A sensor is in fluid communication with the conduit responsive to a physical property of the gas responsive to a condition determined by the gap size and a circuit is responsive to the sensor to provide a signal respective to the physical property.

17 Claims, 4 Drawing Sheets

GAS GAGE WITH ZERO NET GAS FLOW

FIELD OF THE INVENTION

This invention relates to gas gages useful in measuring the spacing of a probe from a surface without touching the surface. This spacing is customarily called a "gap", and because air is the gas most commonly used, such gages are commonly thought of as air gages.

BACKGROUND OF THE INVENTION

There are many applications for non-contact gages which can measure the size of a gap between a probe and a surface. The general principle involved is that a gas jet can be partially blocked by the presence of an object or a surface. The percentage of blocking is roughly proportional to the distance of the probe from the object or surface. Conventionally, the variation in system pressure or the gas flow caused by the blockage is read as the size of the gap. In most applications the gas to be used will be air. However, other gases do offer substantial advantages in special applications, and the term "gas" as used herein is intended to be generic to all suitable gases.

Many such instruments use a high pressure positive flow of gas, and the gas from the instruments blows into the surroundings. For many applications there is no objection to this flow. However, when exquisitely small measurements must be made on the order of one or two millionths of an inch, too high a flow of gas becomes a problem. Adiabatic expansion at the jet causes errors from local cooling, and large amounts of turbulent gas stimulate dust movement which would ordinarily lie dormant. This is not acceptable in clean rooms because it causes work scrappage. Efforts to avoid particulate introduction include very extensive filtration of gas, and the use of specially prepared and temperature controlled gas, usually from an external location. This is expensive, troublesome, and generally only partly successful.

Very low pressure gas systems, such as disclosed in Wilson U.S. Pat. No. 4,142,401, cause far fewer difficulties and are now being used, for autofocusing of semiconductor cameras which are operating at the leading edge of U.S. technology for sub-micron integrated circuit manufacture. These instruments perform to a very high degree of accuracy. The Wilson patent is incorporated herein by reference in its entirety for its showing of the use of a gas gage capable of measuring extremely small gaps.

However, this invention provides an improvement over all previous systems including the system shown in the Wilson patent by utilizing a basically new concept of employing gas in an "alternating current" or "a.c" fashion instead of in the "direct current" or "d.c." gas flow previously used. This invention moves a tiny puff of gas in one direction, and then sucks it back immediately. This alternating action can take place at from a few times per second, up to many thousands of times per second, depending upon the type of sensor used and the net system data speed resolution required by the user. In this invention, there is no net flow of gas into the surrounding regions, and the risk of contaminating the work pieces is greatly reduced.

The pump for generating this alternating gas flow can be of many types, including magnetic solenoids, piezoelectric motion generators, moving coil loud speaker devices, and the like. They may be made to resonate mechanically to improve output or to reduce power requirements. These devices can be very tiny and can be placed right on the probe conduit being used for the measurement sensing.

The high speed sensors used for "a.c." gas gaging must be rapid enough to respond to the gas pump oscillations. They may be the hot-wire anemometer type described in Wilson patent. They may also be a high speed diaphragm type which can measure dynamic pressure changes. Throughout this specification, the term "dynamic" is used in the sense of causing or sensing properties which are changing rather than static. A dynamic device will not measure a static property.

The configuration of the gaging instrument can vary from simple single conduit sensing jets with one single sided sensor, to dual balanced units using an active jet and a reference jet to cancel out some external interfering effect such as room temperature variation and ambient gas pressure variations from air conditioners and doors opening and closing.

It is significant to this invention that in the electronic circuitry great advantage can be taken in using "synchronous demodulation". This technique can detect coherent and useful data in a background of greatly higher noise and static.

Perhaps the most significant object of this invention is to provide an instrument which does not introduce particulates into the surrounding region.

It is another object of this invention to permit measurements considerably smaller than one millionth of an inch. This is accomplished, resulting in very simple equipment with a reduced sensitivity to air currents, drafts, and stray pressure variations such as are often caused by air conditioners and the opening and closing of doors. This invention reduces measurement errors caused by such events to less than one millionth of an inch.

Still another object of this invention is to eliminate substantial plumbing, valves, and tubings leading to the sensing orifice. The plumbing especially the tubings, is a source of data artifacts whenever the probe is physically scanned across a workpiece surface to create a chart profile. Bending and bumping of hoses can cause gas pumping that creates data artifacts in d.c. gas systems, and special precautions must be taken to minimize them. This invention substantially overcomes this problem.

Yet another object of this invention is to provide an instrument which has only minimal power consumption. In fact it may be less than one watt including the gas supply. Such power is readily supplied by a battery, thereby further decreasing the bulk and complexity of the instrument. A gas supply for this instrument can operate on a power of 0.15 watts. This is an improvement by a factor of one hundred over previous units, and requires almost no warm-up time to reach equilibrium.

BRIEF DESCRIPTION OF THE INVENTION

An instrument according to this invention is intended to measure the gap between a sensing orifice and a surface facing the sensing orifice.

A pressure or flow measurement upstream from the sensing orifice senses the extent of the blockage, and from this the size of the gap is deduced.

According to a feature of this invention, the gas supplied to the sensing orifice is provided as an alternating current flow ("a.c."), the gas oscillating past a sensor which responds to variations in the gas stream. The outward flow each cycle is substantially equal to the inward flow, so there is no net gas flow away from the sensing orifice to enter the room, stirring up artifacts in the room or introducing artifacts from its own gas supply. There may be some intermingling of the cycled gas with immediately surrounding air, but this will be minimal.

According to a preferred but optional feature of this invention the sensor outputs are a.c. coupled, and therefore eliminate the many problems of d.c. systems, for example drift, and temperature and thermocouple effects among others.

Furthermore, this instrument is amenable to the use of the technique known as synchronous demodulation so that a clean signal can be derived from very cluttered observations.

The above and other features of this invention will be fully understood from the following detailed description and the accompanying drawings, in which:

DETAILED DESCRIPTION OF THE INVENTION

Figure 1:
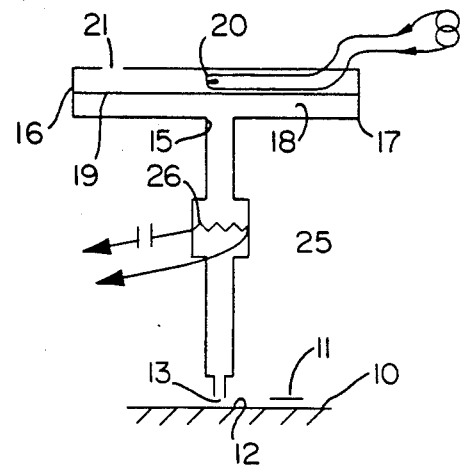
FIG. 1 is a semi-schematic view of an embodiment of the invention.

The function of every embodiment of the invention is disclosed in FIG 1. A workpiece 10 is to be scanned and the gap 11 between its surface 12 and a sensing orifice 13 is to be measured. This measurement is useful for a wide variety of applications. At the present time it is frequently used as part of a feedback loop to maintain a predetermined gap. Another application is to scan the workpiece surface to determine its flatness. In the applications involved, millionths of an inch are important for flatness and for location. To the extent that these properties can be controlled or maintained, there are substantial economic advantages.

A gas conduit 15 extends from the sensing orifice to a gas pump 16. The gas pump has a body 17 with a pumping plenum 18 partially bounded by a movable wall 19. The preferred movable wall is a diaphragm formed as part of a loud speaker. An actuating coil 20 energized by circuitry (not shown) will cause the diaphragm to oscillate at a pre-determined frequency and amplitude to cause a corresponding a.c. flow of gas in the gas conduit. A vent port 21 vents the back side of the diaphragm.

Figure 3:
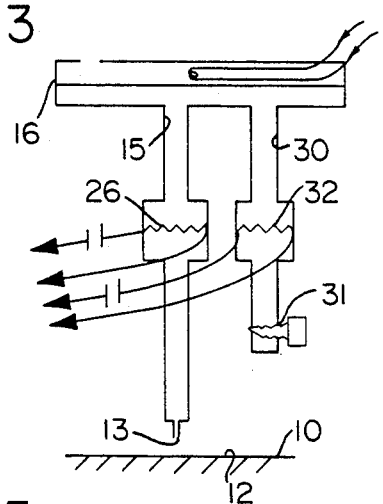
FIG. 3 is a semi-schematic view of still another embodiment of the invention.

A sensor 25 which in FIG. I is a hot-wire anemometer as in the Wilson patent, is disposed in the gas conduit. Wire 26 is a very fine wire which receives a current from a power supply. Its resistance will be varied each time the gas flow changes direction because of the resulting change of temperature. The change in resistance will be proportional to the blockage at the sensing orifice as sensed by the flow past the sensor. As will later be discussed, the wire is capacitatively coupled to an amplifier circuit, which forms part of the measurement system FIG. 3 shows another hot wire sensor application. As in every embodiment of the invention this device also has a pump, a gas conduit, and a sensing orifice. Throughout this specification, like items will bear the same number. Also in this embodiment there is a hot wire anemometer 26 in the gas conduit. The embodiment differs from FIG. I in that it also includes a reference conduit 80 which extends from the pump to an adjustable needle valve 31. A reference hot wire sensor 32 is disposed in the reference conduit.

As will be apparent, the inclusion of a reference conduit provides a means to separate stray variables from the signals produced in the gas conduit. Both conduits receive gas simultaneously from the pump and discharge them through a respective orifice. Both are subjected to the same ambient variations, and only the gas conduit is subjected to the variations caused by the conditions at the gap. Thus, conventional bridge circuitry can be utilized to isolate the measurement data from the general data, all as will later be described.

Figure 5:
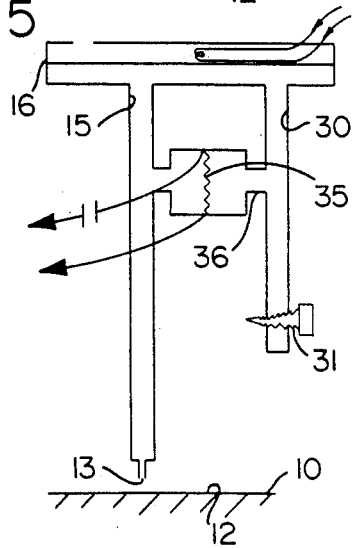
FIG. 5 is a semi-schematic view of another embodiment of the invention.

FIG. 5 is still another hot wire anemometer device. As in FIG 3 (but not in FIG. 1), it also has a reference conduit and needle valve. However, instead of employing two hot wires as in FIG. 3, only one hot wire 85 is provided, and this is in a different location.

A bridge conduit 36 interconnects gas conduit 15 and reference conduit 30. Hot wire 35 is located in the bridge conduit. It is therefore responsive only to movement of gas that is the consequence of a differential between the pressures in the conduits. This differential thereby is a function of the gap size, and is free from ambient distortions.

The embodiments of FIGS. 1, 3 and 5 have in common the use of gas flow across a hot wire to obtain data. While pressures do in fact determine the rate and volume of flow, still these embodiments are essentially flow-responsive, because it is the cooling effect of the flowing gas on the hot wire that is the basis of measurement and this is proportional to the flow. A signal will be developed at twice the frequency of the diaphragm, because gas flows over the wire each half cycle.

Figure 2:
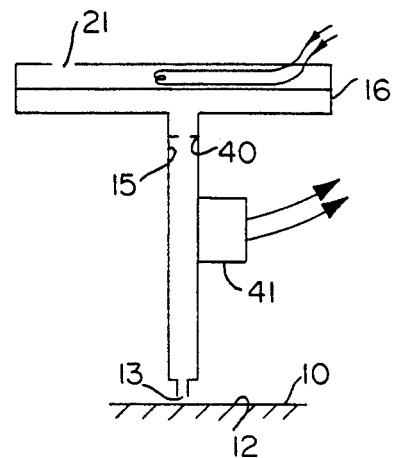
FIG. 2 is a semi-schematic view of another embodiment of the invention, both FIGS. 1 and 2 employing only a single conduit.
Figure 4:
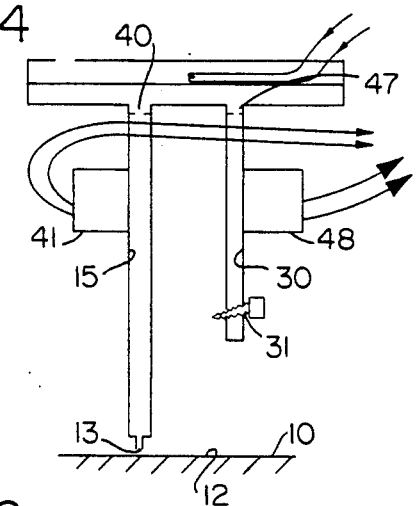
FIG. 4 is a semi-schematic view of still another embodiment of the invention, both FIGS. 3 and 4 employing a pair of conduits.
Figure 6:
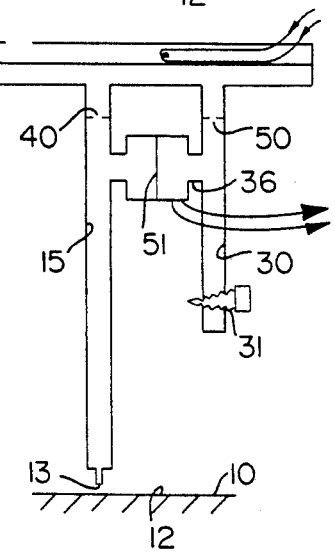
FIG. 6 is a semi-schematic view of another embodiment of the invention, both FIGS. 5 and 6 employing a pair of conduits as in FIGS. 3 and 4, and also a bridge conduit.

The embodiment of FIG. 2 is much the same as that of FIG. 1, except that in this embodiment, as in FIGs. 4 and 6 also, the pressure pulses are of primary interest rather than the flow. For this reason, gas conduit 15 includes a restriction orifice 40. The pressure pulse from the pump is propagated at the speed of sound.

Instead of a hot wire anemometer sensor, this embodiment uses a dynamic pressure sensor 41, preferably of the diaphragm type to be disclosed in further detail below. It has a suitable dynamic response, responsive to pressure pulses that result from the combined effects of the pump and of the conditions at the sensing orifice.

Figure 8:
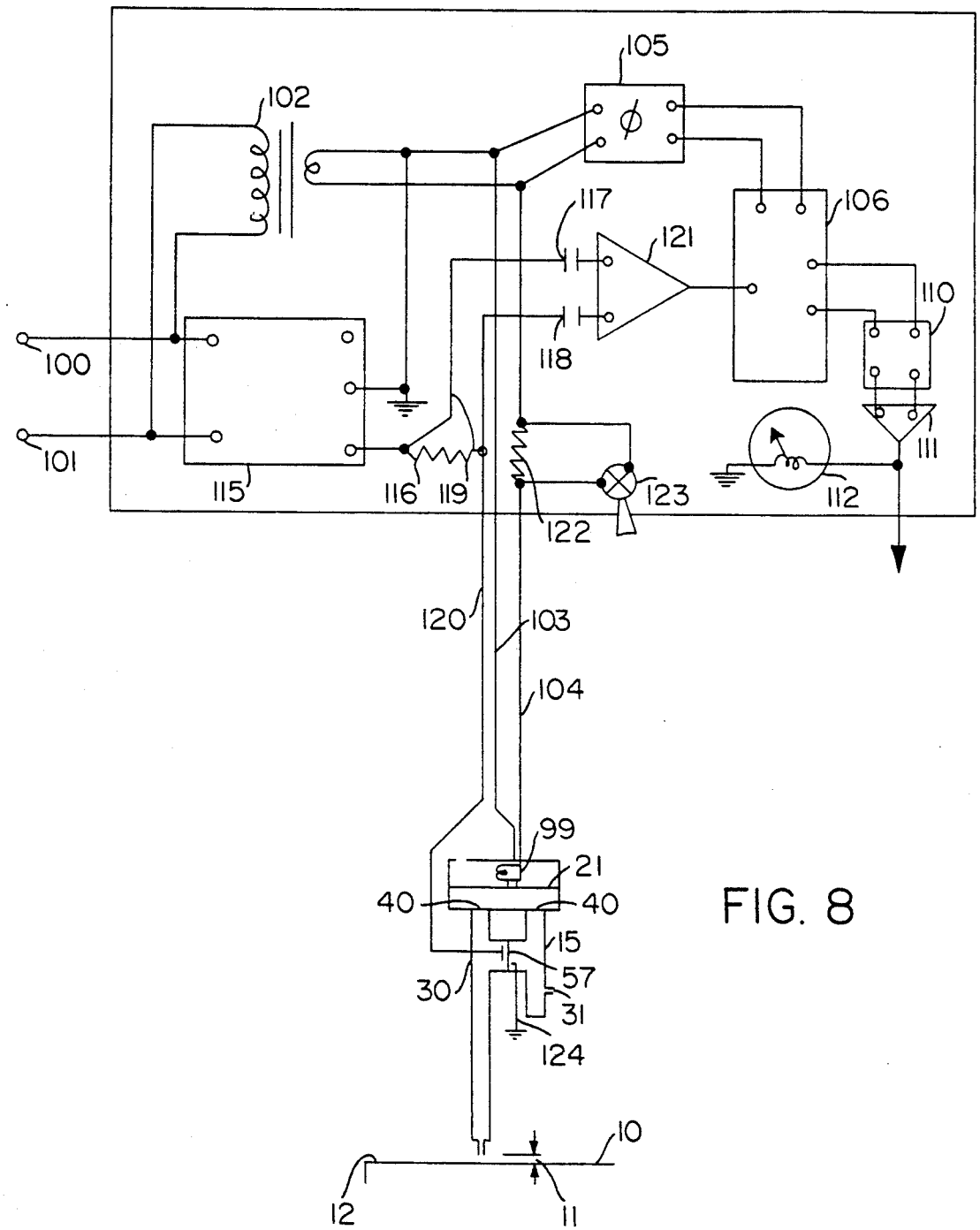
FIG. 8 is a circuit diagram of a circuit useful with any of the embodiments of FIGS. 2, 4 and 6, but more particularly directed to FIG. 6.

FIG. 4 is similar in general concept to FIG. 8, in that it includes a reference conduit 80. However, a restrictive orifice 47 is included in it, also. In addition, a dynamic pressure sensor 48 is also used in the reference conduit.

FIG. 6 is similar in general concept to FIG. 5, except that a restrictive orifice 80 is included in the reference conduit, and that a dynamic differential pressure sensor 51 is disposed in the bridge conduit, responsive to differential pressure between the gas conduit and the reference conduit.

The reader will now perceive that the pulsing, oscillating gas stream is sensed solely, or along with a reference stream, to gage sense the size of the gap. The advantages of this system which uses a.c. gas, compared to a continuous stream of gas introduced into clean areas, will be apparent, and these constitute a principal benefit of this invention.

Before going into the further advantages of this invention, a few background observations may be useful. In addition to its cleanliness, which is a physical situation that reduces the scrap rate in operations in very clean rooms, circuitry can be provided which can give more reliable readings, all of which can be included in relatively small envelopes, and which require very little power.

These advantages are also attained by the use of oscillating gas which is coherently pumped at a particular frequency, and this frequency is used to interrogate a synchronous demodulator for coherency at that frequency only.

Carrier systems have been used for many years, such as strain gage bridges which use alternating current and excitation drive. The output signal may be synchronously demodulated to recover the data required. Such systems eliminate drifts and errors caused by thermocouple effects and other low frequency disturbances that plague d.c. systems. However, they do not remove errors caused by temperature changes which cause the value of the resistance of the individual strain gage arms to vary.

With the utilization of a.c. gas sensing, the data itself is modulated. With the usage of a dynamic pressure sensor or a hotwire anemometer placed in a bridge conduit between an active sensing leg and a reference leg, the drifts caused by resistance changes in the individual legs of the bridge are removed, as only differential pressure pulses or flow pulses are amplified by the capacitor-coupled amplifiers.

It should be appreciated that hot wire sensors are cooled both by the gas flowing out and by the gas flowing in. They generate flow signals at twice the frequency of the gas oscillations and the synchronous demodulator should be interrogated twice per gas oscillation cycle. If one operates a gas pump at 60 Hz the interrogation should be at 120 Hz, when a hot wire sensor is used. It should be at 60 Hz for the dynamic pressure sensor as these units are actuated at the same rate as the gas pump.

For the presently-preferred embodiment of FIG. 6, the differential pressure sensor is quite unique. It is dynamic in that it only measures the oscillation amplitudes of the system's pressure variations, not their d.c. value. Its average value is always zero, no matter what the static pressure value may be. It uses a differential diaphragm, which responds only to the difference in pressure between its two sides, and this difference is only the difference in pressure oscillations between the two sides. Static pressure values are not detected.

This characteristic can be achieved by several methods. One is to use the diaphragm itself as one plate of a variable capacitor whose value is determined by the physical spacing between the diaphragm and a fixed electrode plate nearby. When a fixed d.c. voltage is applied between the diaphragm and the electrode, a varying current will be generated as the diaphragm-to-electrode spacing is varied by the pressure oscillations. Only diaphragm motions can cause an output signal. Static pressure causes no output.

Another device uses a moving coil in a magnet which is caused to move in respect to each other by motions of the diaphragm, thus generating an a.c. voltage proportional to the systems pressure oscillations. Again, static pressure will generate no signals.

It is instructive to note that most non-contacting sensors, such as capacitance, eddy current, light and laser, depend upon dielectric constant resistivity, reflectivity and color. Local variations in these properties can give false indications of geometry. G-as gaging is not subject to these kinds of errors. It is independent of physical properties of the workpiece.

Figure 7:
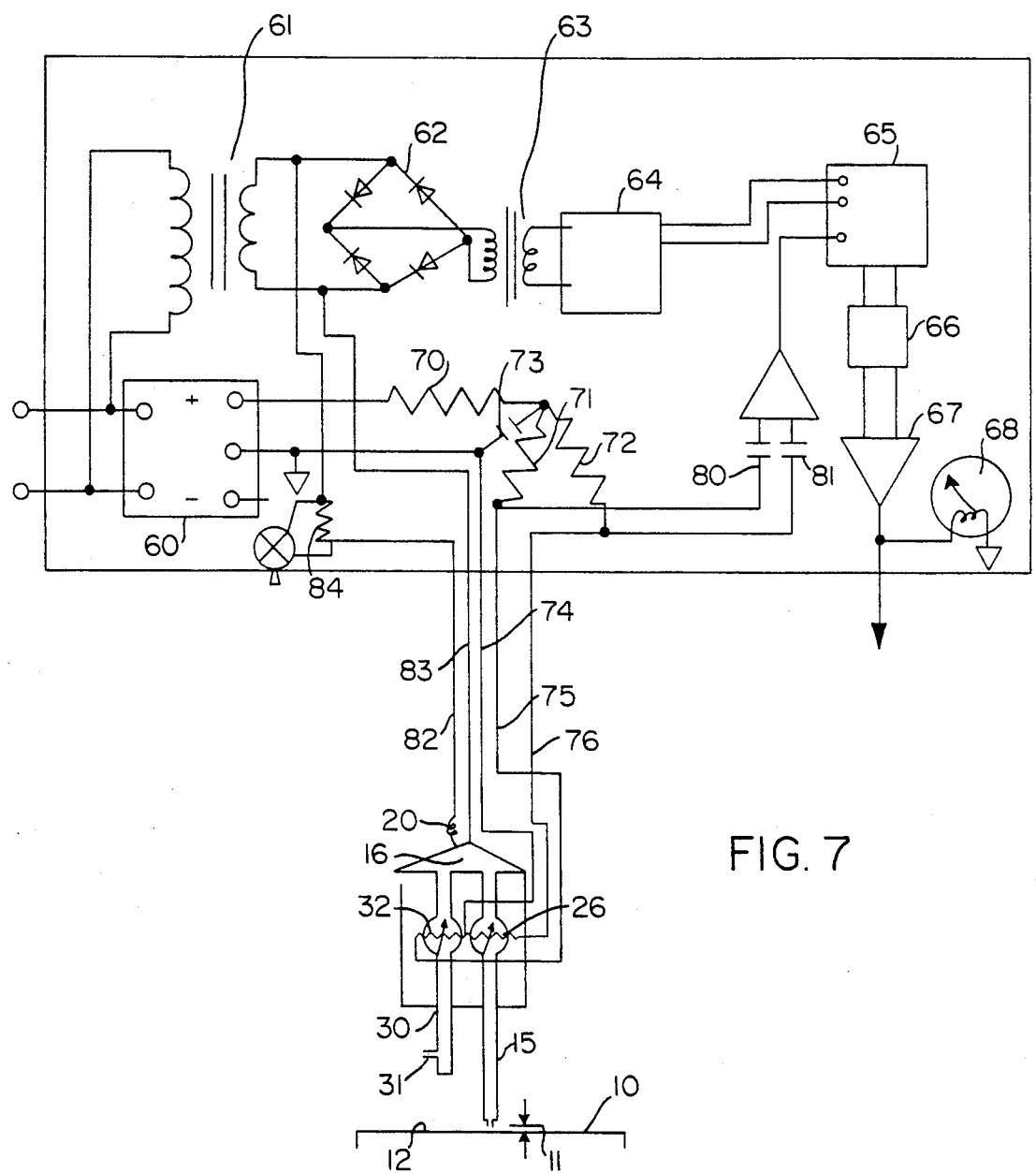
FIG. 7 is a circuit diagram of a circuit useful with any of the embodiments of FIGS. 1, 3 and 5, but more particularly directed to FIG. 3.

FIG. 7 is an illustrative example of a circuit useful with this invention, and especially to the device of FIG. 8. A person skilled in the art can readily make such adaptions as he wishes generally and more specifically to fit the other embodiments.

A regulated d.c. power supply 60 receives a.c. from an external source and provides 15 volt d.c. A stepdown transformer 61 produces 3.5 volts a.c., in this embodiment at 60 Hz. A full wave rectifier 62 is bridged by a coupling transformer 63, which in turn is connected to a phase shifter 64. The purpose of the full-wave rectifier is to double the line frequency so the synchronous demodulator will be interrogated twice per cycle in the case of the hot-wire sensor arrangement Phase shifter 64 is connected to a synchronous demodulator 65, of which further details are given below. Phase shifter 64 enables fine tuning of the demodulator. A low pass filter 66 removes the carrier signal from the demodulator, and provides its output to an amplifier and linearizer 67. A read out meter 68 and if desired a chart recorder (not shown), complete this part of the circuit.

The d.c. output from the d.c. power supply is provided to a dropping resistor 70 and thence to two bridge resistors 71.72. A noise filter 73 is connected to the joiner of resistors 71 and 72 and to a ground.

Sensors 26 and 82 are connected to each other, and by lead 74 to ground. Their other ends are connected to leads 75 and 76 to coupling capacitors 80 and 81.

Coupling capacitors 80, 81 connect bridge resistors 71 and 72 to an a.c. amplifier, which in turn is connected to the demodulator. They are also connected to bridge resistors 71 and 72. The step down transformer is connected to the pump coil by leads 82, 83, one of them including a small dropping resistor 84.

FIG. 8 shows a circuit best adapted for use with the embodiment of FIG. 6, which is the presently preferred embodiment of the invention.

The general configuration of the gases is shown as in FIG. 6, with its gas conduit 18, reference conduit 80, and bridge conduit 36. Sensor 51 is located in the bridge conduit to be responsive to differential pressures in the gas conduit and reference conduit. Pump 21 is shown, and also restrictors 40 and 50.

Figure 9:
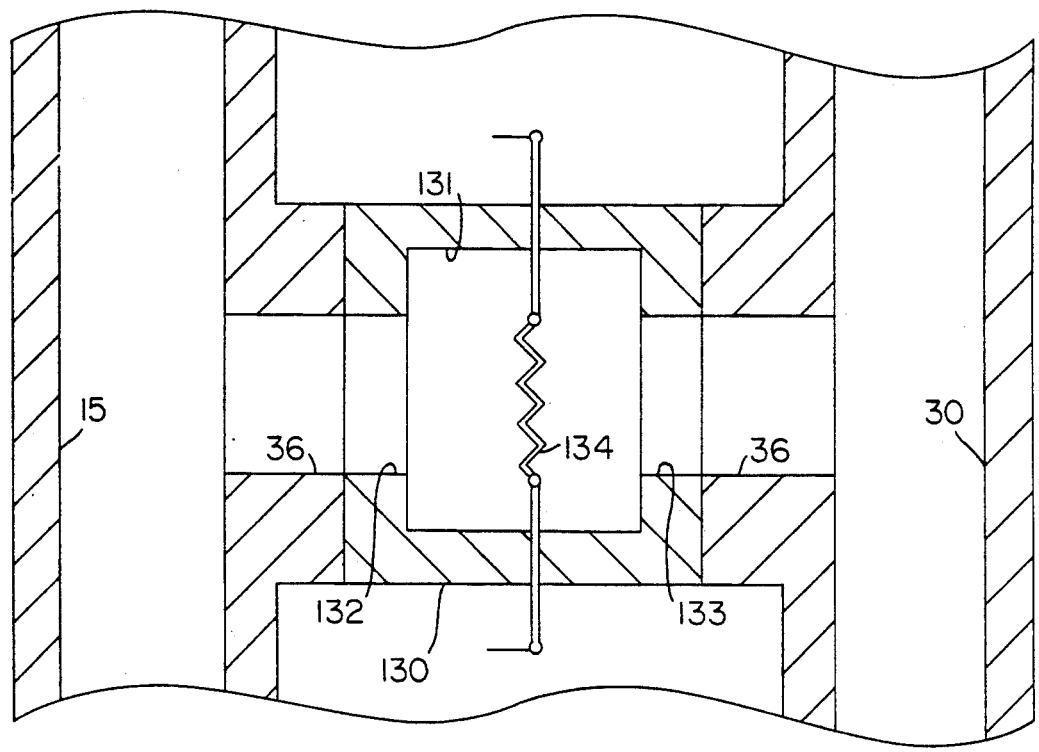
FIG. 9 is an axial cross-section of one type of sensor useful in this invention.

The sensor is a dynamic type, best shown in FIG. 9. The pump is powered by a classical voice coil 99, or other means to create oscillation of the diaphragm.

Power leads 100, 101 connect to a step down transformer 102 which powers the gas pump through leads 103, 104. A phase shifter 105 to fine-tune the demodulator is connected to the transformer, and to a synchronous demodulator 106 as previously described.

A low pass filter 110 removes the carrier signal, and its output is fed to an amplifier and linearizer 111 which is connected to a readout meter 112, and if desired also to a chart recorder (not shown).

A regulated d.c. power supply 115 provides d.c current to a dropping resistor 116 which senses the output from the sensor.

Coupling capacitors 117 and 118 couple the outputs from leads 119 and 120 to an amplifier 121, which in turn supplies its output to the synchronous demodulator. The capacitors eliminate d.c. drift. Lead 120 connects to one sIde of the sensor, and ground lead 124 grounds the other side. Lead 124 could be connected instead to grounded lead 103 for the identical effect.

A small dropping resistor 122 is placed in lead 104 to enable known reductions in the gas pump drive for calibration purposes. A switch 123 can by-pass this resistor.

A suitable sensor for use in FIGS. 1, 3, and 5 is shown in FIG. 9. The sensor has a body 180 with a central passage 131 extending between its end ports 132 and 133. It forms part of the conduit in which it is placed. A hot wire 134 is placed in the passage, adapted to be connected to circuitry as described above.

Figure 10:
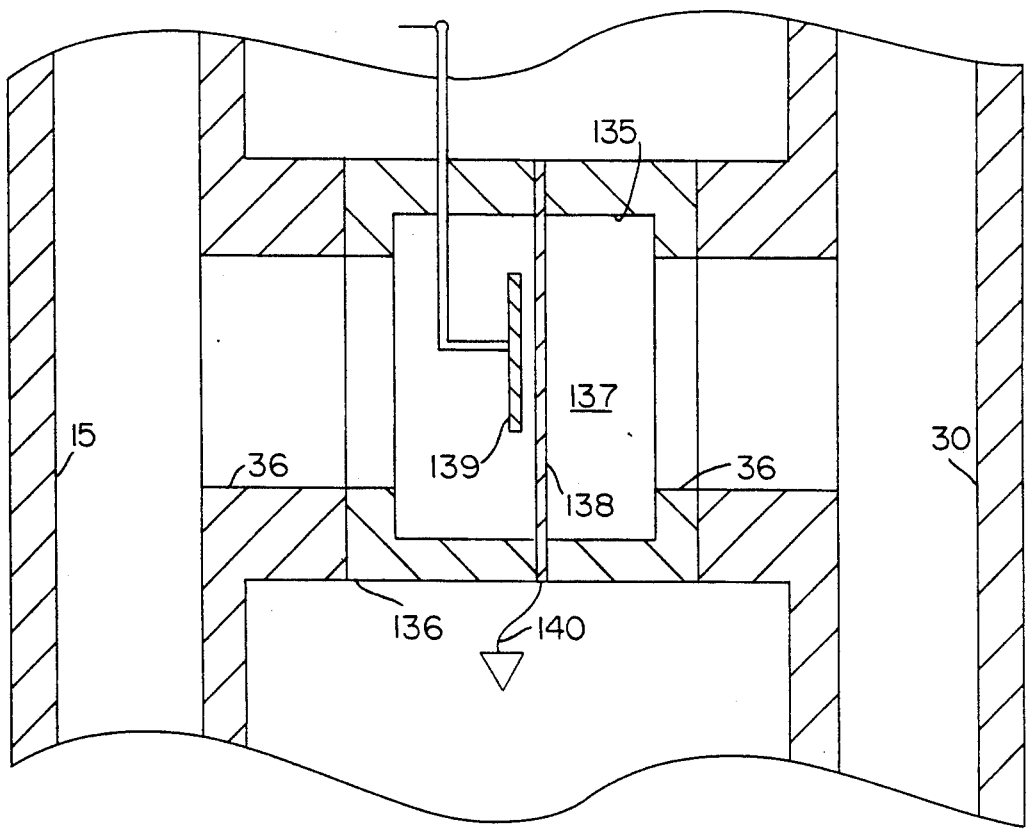
FIG. 10 is an axial cross-section of yet another sensor useful in this invention.

FIG. 10 shows a dynamic sensor 135 such as sensor 51 in FIG. 8. This sensor has a body 136 with a central cavity 137 to be connected into the bridge conduit. A differential pressure sensing diaphragm 138 extends across the cavity, and faces a variable capacitor electrode 189 supported in the cavity adjacent to the diaphragm. Sensing diaphragm 138 is metallic and grounded by lead 140 (or merely be itself being in contact with grounded structure). Movement of the diaphragm will produce a dynamic signal respective to the varying pressure.

This invention is an elegantly simple device, eminently suited to very clean environments, but useful in all environments. While it is principally attractive for gaging small gaps, it is equally useful for gaging larger gaps. Also, the signals or readings it produces, while they generally will be used as measurements, are also useful as control means in systems where the maintenance of a gap is part of the control logic.

Some of the components used in this system can readily be bought off the shelf. For example, the demodulator can utilized can be Balanced Modulator/-Demodulator AD 360 manufactured by Analog Devices and this device is incorporated herein by reference for its showing of a demodulator which regularly polls a selected frequency to obtain data respective to that frequency. In the operation of the instant device, the frequency can be adjustably varied, but 60 Hz will commonly be used. Polling will take place at 60 Hz or 120 Hz as appropriate, and data exclusively respective to that frequency will be obtained, without extraneous noise and clutter. Of course it will be synchronized with the pump so as to detect the effects in each half cycle.

For hot wire sensors, the Microbridge Mass Airflow Sensor manufactured by the Honeywell Corporation is suitable.

The dynamic sensors may conveniently be derived from pressure sensors which utilize a diaphragm, modifying the construction to exert pressure on both sides when a differential pressure is to be measured, or on only one side when not used in a bridge conduit.

As to the pump, a single pump may be used, or a pair of them instead of one may be used when two conduits are employed. They would of course be synchronized with one another. Usually only a single pump will be used.

Air will usually be the gas used in this instrument. However, other gases can have important advantages which in some instances can justify the nuisance of their use. For example, the speed of sound in Helium is faster than the speed of sound in air and its thermal conductivity is much higher for hot-wire sensing. Under some circumstances, the use of Helium can be justified because of these properties. Other gases may have the same or other advantages. Because the net flow of gas in this "a.c." system is zero, only a very tiny amount of Helium would be required to balance out any inter-mixing at the exit orifice.

This invention is not to be limited by the embodiments shown in the drawings and described in the description, which are given by way of example and not of limitation but only in accordance with the scope of the appended claims.

I claim:

1. An instrument for measuring a gap between it and an opposing surface, comprising:
   a gas conduit having an inlet and an outlet;
   a sensing orifice in the outlet intended to be directed toward said opposing surface;
   a gas pump connected to said inlet, said gas pump applying to said gas conduit an alternating pressure to cause puffs of gas to exit said sensing orifice, and to be drawn back into said sensing orifice in a continuously alternating operation;
   a sensor in fluid communication to said conduit responsive to a physical property of the gas responsive to a condition determined by the gap size; and
   circuit means responsive to said sensor to provide a signal respective to said physical property.

2. An instrument according to claim I in which saId sensor is a hot-wire anemometer whose resistance changes as a function of flow rate across it, said flow rate being proportional to the size of the gap.

3. An instrument according to claim 2 in which flow across said anemometer occurs twice each pumping cycle to provide said signal twice each cycle.

4. An instrument according to claim I in which said sensor is a dynamic device responsive to changes in said property to produce a dynamic a.c. signal.

5. An instrument according to claim 3 in which a reference conduit receives pumping pulses simultaneously with said gas conduit, and in which a said sensor is also placed in said reference conduit, said reference conduit having a bleed orifice, said circuit means receiving the output from both sensors whereby to produce a signal which excludes environmental variables to which both conduits are subject.

6. An instrument according to claim 5 in which flow across said anemometer occurs twice each pumping cycle to provide said signal twice each cycle.

7. An instrument according to claim 4 in which a reference conduit receives pumping pulses simultaneously with said gas conduit, and in which a said sensor is also placed in said reference conduit, said reference conduit having a bleed orifice, said circuit means receiving the output from both sensor, whereby to produce a signal which excludes environmental variables to which both conduits are subject.

8. An instrument according to claim 1 in which said circuit means includes a synchronous demodulator polled at the same frequency as the sensor is exposed to said property, whereby to produce an output which excludes at least some artifacts generated by surroundings of the instrument.

9. An instrument according to claim 3 in which said circuit means includes a synchronous demodulator polled at the same frequency as the sensor is exposed to said property, whereby to produce an output which excludes at least some artifacts generated by surroundings of the instrument.

10. An instrument according to claim 7 in which said circuit means includes a synchronous demodulator polled at the same frequency as the sensor is exposed to said property, whereby to produce an output which excludes at lease some artifacts generated by surroundings of the instrument.

11. An instrument for measuring a gap between it and an opposing surface, comprising:
   a gas conduit having an inlet end and an outlet end;
   a sensing orifice in the outlet end intended to be directed toward said opposing surface;
   a reference conduit having an inlet end and an outlet end;
   a bleed orifice in the outlet end of the reference conduit;
   a gas pump means connected to said inlet ends, said gas pump means applying to said conduits an alternating pressure to cause puffs of gas to exit said orifices, and to be drawn back into said sensing orifice in a continuously alternating operation;
   a bridge conduit joining said gas conduit and reference conduit between their respective inlet and outlet ends;
   a sensor in said bridge conduit responsive to a physical property of the gas responsive to a condition determined by the gap size; and
   circuit means responsive to said sensor to provide a signal respective to said physical property.

12. An instrument according to claim 11 in which said sensor is a hot-wire anemometer whose resistance changes as a function of flow rate across it, said flow rate being proportional to the size of the gap.

13. An instrument according to claim 12 in which flow across said anemometer occurs twice each pumping cycle to provide said signal twice each cycle.

14. An instrument according to claim 11 in which said sensor is a dynamic device responsive to changes in said property to produce a dynamic a.c. signal.

15. An instrument according to claim 11 in which said circuit means includes a synchronous demodulator polled at the same frequency as the sensor is exposed to said property, whereby to produce an output which excludes at least some artifacts generated by surroundings of the instrument.

16. An instrument according to claim 12 in which said circuit means includes a synchronous demodulator polled at the same frequency as the sensor is exposed to said property, whereby to produce an output which excludes at least some artifacts generated by surroundings of the instrument.

17. An instrument according to claim 14 in which said circuit means includes a synchronous demodulator polled at the same frequency as the sensor is exposed to said property, whereby to produce an output which excludes at least some artifacts generated by surroundings of the instrument.

* * * * *